(12) United States Patent
Moscovici et al.

(10) Patent No.: US 10,412,046 B2
(45) Date of Patent: Sep. 10, 2019

(54) METHOD OF, AND A DEVICE FOR UPDATING A MULTIPLE-PROCESSING ENTITY PACKET MANAGEMENT SYSTEM, AND ASSOCIATED COMPUTER PROGRAM PRODUCT

(71) Applicants: Avishay Moscovici, Tel Aviv (IL); Michal Silbermintz, Tel Mond (IL)

(72) Inventors: Avishay Moscovici, Tel Aviv (IL); Michal Silbermintz, Tel Mond (IL)

(73) Assignee: NXP USA, Inc., Austin, TX (US)

( * ) Notice: Subject to any disclaimer, the term of this patent is extended or adjusted under 35 U.S.C. 154(b) by 1131 days.

(21) Appl. No.: 14/306,602

(22) Filed: Jun. 17, 2014

(65) Prior Publication Data
US 2015/0363448 A1    Dec. 17, 2015

(51) Int. Cl.
| H04L 29/06 | (2006.01) |
| G06F 16/16 | (2019.01) |
| G06F 16/2458 | (2019.01) |
| G06F 16/21 | (2019.01) |
| H04L 12/755 | (2013.01) |
| H04L 12/715 | (2013.01) |
| H04L 12/741 | (2013.01) |

(52) U.S. Cl.
CPC .......... *H04L 63/0227* (2013.01); *G06F 16/16* (2019.01); *G06F 16/219* (2019.01); *G06F 16/2474* (2019.01); *H04L 45/021* (2013.01); *H04L 45/64* (2013.01); *H04L 45/745* (2013.01); *H04L 63/1416* (2013.01); *H04L 45/54* (2013.01)

(58) Field of Classification Search
CPC ......... G06F 17/30339; G06F 17/30477; G06F 16/219; G06F 16/2474
See application file for complete search history.

(56) References Cited

U.S. PATENT DOCUMENTS

| 6,018,763 A * | 1/2000 | Hughes | G06F 12/0822 703/24 |
| 8,279,773 B2 * | 10/2012 | Song | H04L 1/0047 370/252 |
| 8,516,021 B2 * | 8/2013 | Aronovich | G06F 17/30115 707/826 |
| 2012/0213074 A1 * | 8/2012 | Goldfarb | H04L 43/026 370/235 |
| 2013/0031304 A1 * | 1/2013 | Snyder | G06F 12/0246 711/104 |
| 2013/0298124 A1 * | 11/2013 | Vembu | G06F 9/4403 718/1 |
| 2016/0306622 A1 * | 10/2016 | Kim | G06F 8/654 |

* cited by examiner

*Primary Examiner* — Boris Gorney
*Assistant Examiner* — Loan T Nguyen

(57) ABSTRACT

There is described a method of managing a flow of data packets in a multiple-processing entity system comprising a plurality of look-up tables adapted to store information associated to actions to be performed on packets received by the system. The method comprises storing, on a per entry basis, in a shadowed entry associated to any table entry being updated, the previous content of said table entry being updated, in association with a table entry version number, for use for managing packets received in the system prior to any update operation. It is thus possible to continue using look-up tables while updating process is being carried out for some or all of the table entries. The solution provides benefits for systems that are limited in space and cost, by use of minimal memory thanks to the storing of small shadowed data instead of full shadowed table.

16 Claims, 6 Drawing Sheets

METHOD OF, AND A DEVICE FOR UPDATING A MULTIPLE-PROCESSING ENTITY PACKET MANAGEMENT SYSTEM, AND ASSOCIATED COMPUTER PROGRAM PRODUCT

FIELD OF THE INVENTION

This invention relates to a method of, and a device for updating a multiple-processing entity packet management system, and to an associated computer program product.

BACKGROUND OF THE INVENTION

Contemporary systems on chip (SoC) usually include multiple processing units or cores, and multiple peripherals. Peripherals may include, for instance, Direct Memory Access (DMA) engines or Digital Signal Processing (DSP) accelerators.

Applications running on such systems may be broken into multiple tasks which can be executed in parallel on the cores. In particular, packet management systems, also known as networking systems, comprise multiple processing cores which are capable of processing packets concurrently.

In the context of networking systems which includes data stream (in the form of data packets) flowing in via a given input port, a processing unit may be in charge of analyzing the packets for the purpose of managing the communication of packets throughout the system.

This may comprise an analysis of the header of the packets coming into the system for determining what has to be done with the packets (routing into another port; drop; passing over to a networking stack in this or another SoC, etc.). This can be achieved either directly based on the data or a portion of the data that is flowing in, or indirectly on the basis of some data which is the outcome of mathematical operation on the above data (such as key information which can be derived from the header of the packet).

A known solution for determining what needs to be done with a packet comprises performing a table lookup (TLU) which allows determining the next action to be applied to the packet, based on information associated with the table entry that is found. A lookup table is a memory array whose contents may be retrieved by simple array indexing operations.

A packet may "flow" through several such tables until the entire path of the packet is determined. Therefore packets flowing through the networking system may be numerous and in various phases of their processing at any given time.

The content of any lookup table may be pre-calculated and stored in memory, or may be pre-fetched as part of a program's initialization phase, for instance. But the table contents may change while the system is being operated. That means that, in parallel to the operation of the system, a need may arise to change the content of the tables. The case may be, also, that a table content which is subject to any single change influences several lookup tables.

Thus the lookup tables used for the purpose of flow control in a networking system may be updated by changing entries in the tables. Changes may occur in more than a single table within the system. While updating two or more lookup tables, each by an atomic update mechanism, packets that passed a first updated table and which did not pass a second updated table may be caught in an undefined state, where past flow control is done by rules of the non-updated system while future flow control is to be made by rules of updated system. Such combination is not valid and may cause undesirable behaviour.

In order to manage a transition from non-updated system to updated system two methods are known, namely System Draining and System Shadowing.

According to a system Draining technique, the programmer stops the introduction of new packets into the non-updated system upon the launch of the lookup tables update process. The non-updated system continues to operate until the residual flow of packets is cleared. Once this flow finishes, the system is updated. The input of packets in the system is resumed once change is completed. This method creates a cease of packet flow coming in the system for the purpose of lookup tables update. However, overall system performance is reduced, since some packets may need to be dropped and, upon frequent dynamic change, the impact may be severe.

According to the System Shadowing technique, the programmer creates a shadow of the non-updated system. Any new packet flows through the updated system while the residual packets of the flow of packets already in the system follow their path through the shadow of the non-updated system until the end. Upon termination of background processing of these residual packets the updated system becomes the new foreground system in use. This method is expensive in terms of memory consumption, especially for systems with large tables.

System Shadowing is illustrated by U.S. Pat. No. 8,516,021 which discloses a method of updating a file system in a Distributed Shared Memory (DSM), using a shadow data segment whose contents are identical to an original data segment currently being updated. All contents are updated in a data segment and all changes are applied concurrently. Users are blocked from accessing the data segments until the writing operation has been completed.

SUMMARY OF THE INVENTION

The present invention provides a method of, and a device for updating a multiple-processing entity packet management system, and an associated computer program product as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

DETAILED DESCRIPTION OF THE PREFERRED EMBODIMENTS

In the following specification, the various aspects the invention will be described with reference to specific embodiments. It will, however, be evident that various modifications and changes may be made therein without departing from the broader scope of the invention as set forth in the appended claims. Because the apparatus implementing the present invention is, for the most part, composed of electronic components and circuits known to those skilled in the art, circuit details will not be explained in any greater extent than that considered necessary for the understanding and appreciation of the underlying concepts of the present invention and in order not to obfuscate or distract from the teachings of the present invention.

The proposed innovation relates to the management of data packets in networking systems, such as implemented as semiconductor devices comprising acceleration engines for the purpose of managing data packets flowing through the device. Such systems may include a plurality of processing entities, such as multiple cores, e.g., central processing units or otherwise, and at least one storage unit in a system memory. Each of the processing entities can execute software and, in particular, can execute actions or tasks on the data packets, which are defined in at least one task data structure.

Figure 1:
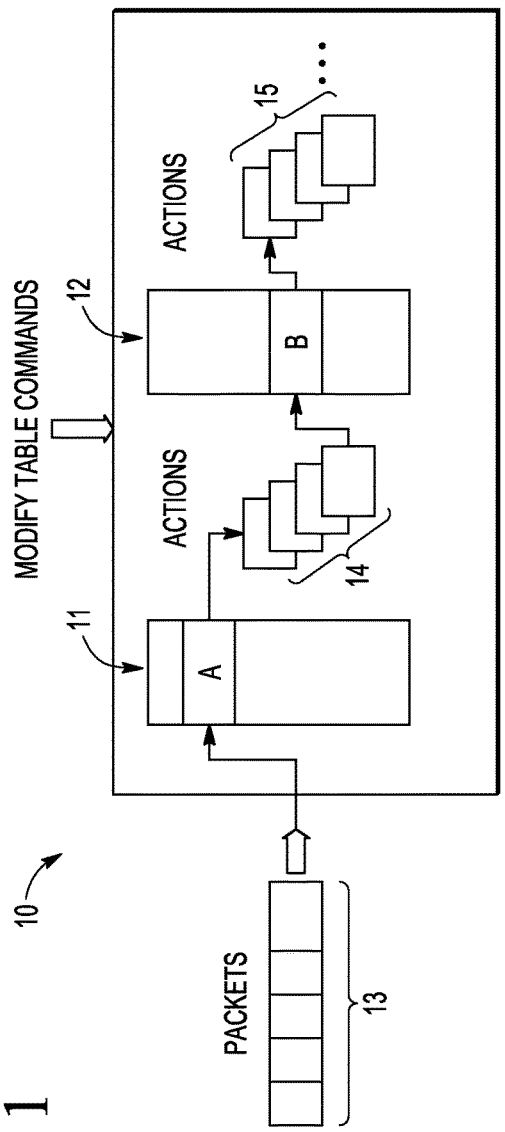
FIG. 1 schematically shows an example of a packet management system with two lookup tables.

The diagram in FIG. 1 shows an example of a networking system 10 capable of managing a flow of packets 13. In the example as shown, the system has a task data structure which comprises a first look-up table 11 and a second look-up table 12. This is purely illustrative, as embodiments are not limited to systems having only two look-up tables. Broadly speaking, the task data structure of the system comprises a series of look-up tables. For example, the number of lookup tables in the series may range between 5 and 10, depending on the specific application.

Each table comprises a plurality of table entries whose contents, in the drawings and in corresponding portions of the following description, are referenced by capital letters. In the shown example, look-up table 11 comprises several table entries, such as the entry whose content is denoted A. Similarly, look-up table 12 comprises several table entries such as entry is denoted B in the example as shown. Each table entry is adapted to store a table content corresponding to, e.g., a list of tasks (or actions) to be performed on the packets which are processed in the system by following a processing path through the look-up tables. These tasks can be defined in any suitable manner, in particular for being stored in form of a list of actions stored in respective storage units of the system memory. The look-up table contents may correspond to a pointer to the storage unit storing the first action in the list, each storage unit further storing the pointer to another storage unit which stores the next action in the list.

In the shown example, look-up table content A of look-up table 11 stores actions 14 to be performed in sequence on a packet flowing to the corresponding entry in said table. Similarly look-up table content B of look-up table 12 stores actions 15 to be performed in sequence on the packet when its processing path reaches the corresponding entry in said table, after completion of the actions 14 defined by entry A of the previous look-up table 11 in the series of look-up tables 11 and 12.

Packets of the flow of packets 13 follow a path through the system 10 which is thus defined by respective entries in the look-up tables. The packets of the flow 13 enter in the system 10 one by one.

While packets are flowing into the system 10 and actions are being performed on them, request for updating the look-up tables, e.g., a modify command, can be received by the system. Responsive to this request, an update of at least one of the table contents is initiated. Such update operation can be requested whenever a change of the actions performed on packets is necessary according to the specific implementation, or whenever an addition/removal of table entries is required. Description of the details of the look-up table update is beyond the purpose of the present disclosure and, therefore will not be provided in what follows. It shall only be noted that an update operation may necessitate modification of the content of at least one and possibly of a plurality of entries within one or more look-up tables.

Figure 2:
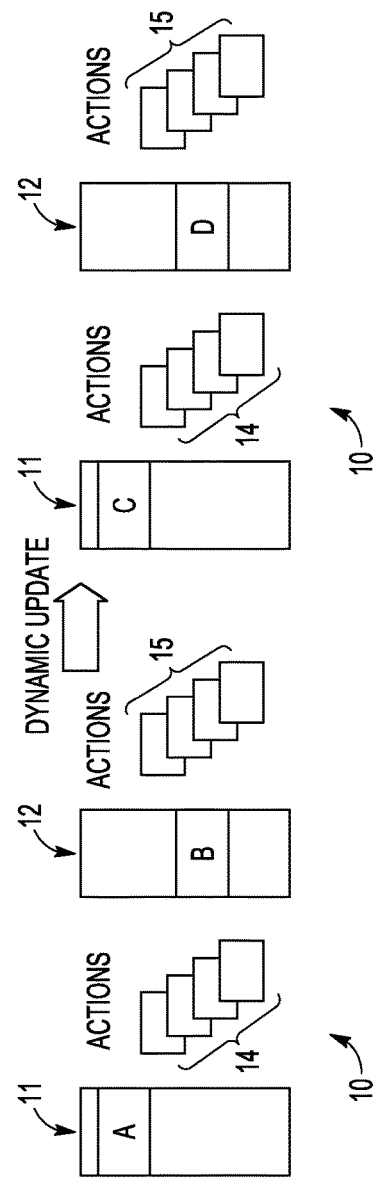
FIG. 2 illustrates a look-up table update operation which can be performed on the system of FIG. 1.

As shown in FIG. 2, entry A of the table 11 and entry B of table 12 which are part of the path for data packets throughout the original, non-updated, system 10 as shown on the left hand side of FIG. 2, are replaced by entry C of table 11 and entry D of table 12, respectively, in the updated system 10 as shown on the right hand side of FIG. 2. Actually, the packet processing path is not changed since entry A and entry C are the same physical table entry of the table 11 but they do not have the same content before and after the update operation, respectively. Similarly, entry B and entry D are the same physical table entry of the second table 12. However entry D does not contain the same actions as entry B, as the result of the table look-up update. In the example as shown, actions 14 of entry A in the non-updated system 10 become actions 16 of entry C in the updated system 10, and actions 15 of entry B in the non-updated system 10 become actions 17 of entry D in the updated system 10.

There will now be described embodiments of the proposed method of managing a flow of data packets in a multiple-processing entity system comprising a plurality of look-up tables adapted to store information associated to actions to be performed on packets received by the system, allows achieving the above. The proposed method allows updating the system as described above while management of a flow of packets through said system is ongoing, and avoiding that packets being managed within the system upon receipt of a request for updating the tables be dropped due to the implementation of transition state of the look-up tables.

Figure 3:
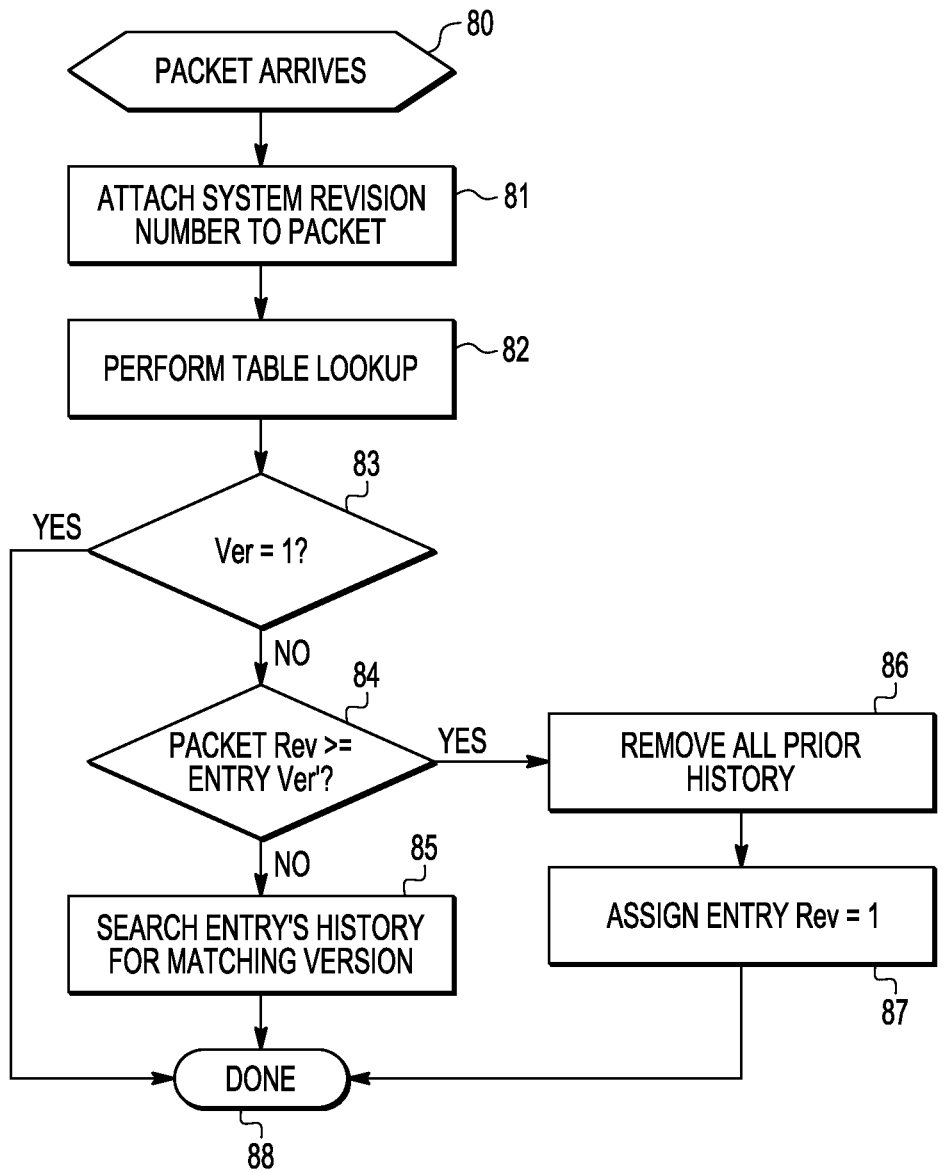
FIG. 3 is a flow chart showing an embodiment of the method of managing packets flowing through the system in a multiple-processing entity packet management system, which can be performed while updating look-up tables.

With reference to FIG. 3, the flow chart as shown therein illustrates an example of implementation of the method of managing packets flowing through the system in a multiple-core packet management system or networking system.

As explained below in more detail, the shown method allows managing a flow of data packets in a multiple-processing entity system comprising a plurality of look-up tables adapted to store information associated to actions to be performed on packets received by the system. The method may comprises, responsive to a request for updating one or more table entries of one or more look-up tables:

incrementing a system revision number associated to the system which identifies the current version of the system, and setting to the current version of the system a table entry version number associated to the table entry being updated which identifies the number of ongoing update operations for the entry; and storing, on a per entry basis, in a shadowed entry associated to any table entry being updated, the previous content of the table entry being updated, in association with the table entry version number, for use for managing packets received in the system prior to any update operation.

Upon receipt of a new packet into the system an attribute may be assigned to the received packet, the attribute corresponding to the system revision number, and, for each look-up table, packets may be processed in their order of receipt in the table. The processing comprises, for each packet:

- performing a table look-up operation in the look-up table, to identify a table entry in the look-up table based on information in a header field of the packet;
- if the packet attribute is equal to or higher than the table entry version number of the identified table entry, then submitting the packet to actions defined by the content of the identified table entry, or else,
- submitting the packet to actions defined by the content of the shadowed entry associated to the identified table entry, the table entry version number of which is equal to the packet attribute.

Thereby, each packet flowing through the system has a consistent view on the actual state of all relevant look-up tables at any instant. Further, its processing can be completed within a budgeted time, which avoids any bottleneck that may otherwise lead to dropping packets received subsequent to the receipt of the request for updating of the look-up tables. The system can thus be updated, meaning that the content of at least one table entry can be updated, while packets are being managed by the system. Each of the table entries can be updated independently from the others. However, several and possibly all table entries can be updated by a single update operation. For instance, in the example of the system 40 shown in FIGS. 4-9, both entry n in table 41 and entry m in table 42 are updated simultaneously.

The diagrams of FIGS. 4-9 illustrate a schematic representation of an example of system 40 similar to the system of FIG. 1, on which a method of updating is applied while the system manages packets. In one example this system may be a Data Path Accelerator Architecture (DPAA) system.

The system comprises a plurality of look-up tables, for instance two such tables 41 and 42 in the example as shown. Each table comprises a plurality of table entries arranged to store contents corresponding to a plurality of actions to be performed on the packets. The system 40 receives packets, one by one, from a flow of packets 43. A packet management scheme is performed using the look-up tables so that packets are submitted to actions stored in the system memory.

In one example, a system revision number Rev is initially set to unity, i.e. to 1, for instance at the power-up of the system. The system revision number can then be incremented, e.g., raised by 1, each time a request for updating at least one look-up table is received by the system from the exterior, depending on the specific application.

Further, a table entry version number Ver is associated to any table entry. Number Ver is initially set to 1 for all entries of all tables, and is set to the current system revision number Rev each time an update operation is performed with respect to the corresponding table entry.

Each look-up table comprises a plurality of table entries whose contents are referenced, in the drawings and in what follows, by capital letters with three parameters indicated into brackets, for instance A (i, j, k) for a content A, where:

- the first parameter i is an integer corresponding to the number of the table within the series of look-up tables, for instance i=1 for table 41 and i=2 for table 42;
- the second parameter j is an integer which identifies the entry, for instance j=n designates a given entry of a first look-up table 41 and j=m for a given entry of a second look-up table 42, in the series of tables of the system; and,
- the third parameter k is an integer which corresponds to the table entry version number Ver discussed above. In one example, the table entry version number is initially set to 1, i.e. Ver=1, for all entries of all tables.

In the shown example, it will be considered entries in look-up table 41 and in look-up table 42, referenced by index n and by index m, respectively, whose original contents (namely before the update operation considered) are denoted A and B, respectively, and whose updated contents are denoted by letters C and D, respectively.

Figure 4:
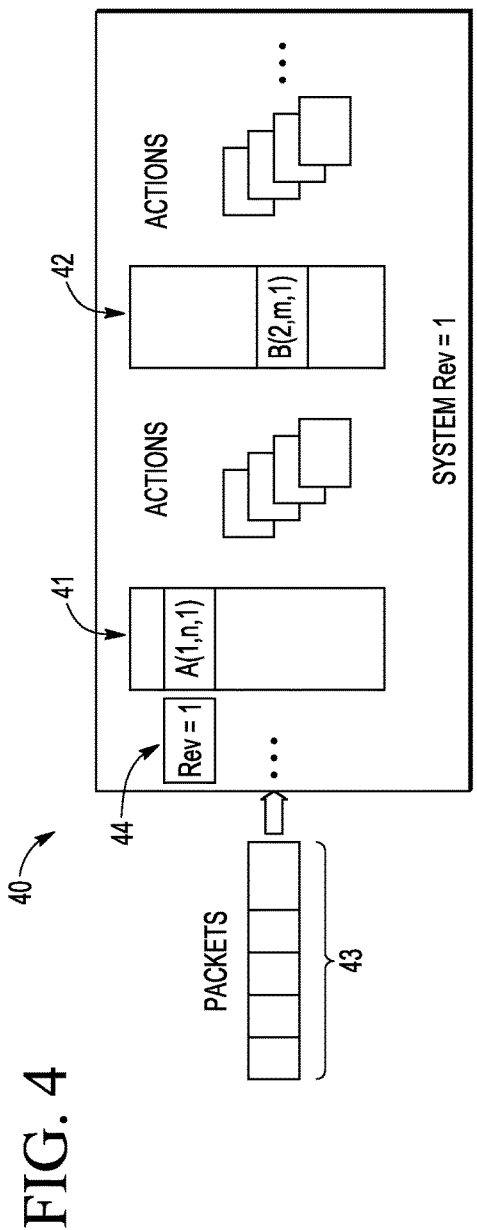
FIGS. 4 to 9 illustrate a system in different phases of a method as shown in FIG. 3.

First, at 80 the system receives a new packet 44 to be processed as illustrated in FIG. 4. It will be assumed that the processing path for this packet goes through entry n of table 41 and through entry m of table 42, successively. This does result from information provided in the packet header, and will not be described in further details here.

At 81, the system assigns an attribute to the received packet, said attribute corresponding to the current value of the system revision number Rev. The system at this stage is shown in FIG. 4. In the example, we have Rev=1, meaning that the system is in its original state, namely has never been updated.

The system performs a table look-up operation at 82, in a look-up table. This table look-up operation allows identifying a table entry within the table, based on information contained in a header field of the packet considered. The identified entry, e.g., the entry referenced by index n in table 41 stores information associated to actions to be performed on the packet, for instance pointers to memory units storing data associated to the actions to be performed. In the shown example of FIG. 4, look-up table content A (1, n, 1) is identified.

Then, at 83 the system checks whether the table entry version number Ver of the table entry identified at 82 is equal to the table entry version number initially set for the identified table entry. In other words, the system checks whether Ver equals unity.

If yes, meaning that the table entry is cannot have been updated since entry of the packet into the system (as reflected by FIG. 4), then the process jumps to 88 to execute on the packet the actions defined by the content A (1, n, 1). According to embodiments, indeed, if the table entry version number of the table entry which is identified at by a given TLU operation is equal to the table entry version number initially set for the identified table entry, then the packet is submitted to actions defined by the content of the identified table entry irrespective of the packet attribute, in other words, the system does not take care of the attribute of the packet.

If no, then the system checks at 84 whether the packet attribute corresponding to the system revision number Rev of the system at the time of entry of the packet in the system is equal to, or higher than the table entry version number Ver of the identified table entry of index n.

Figure 6:
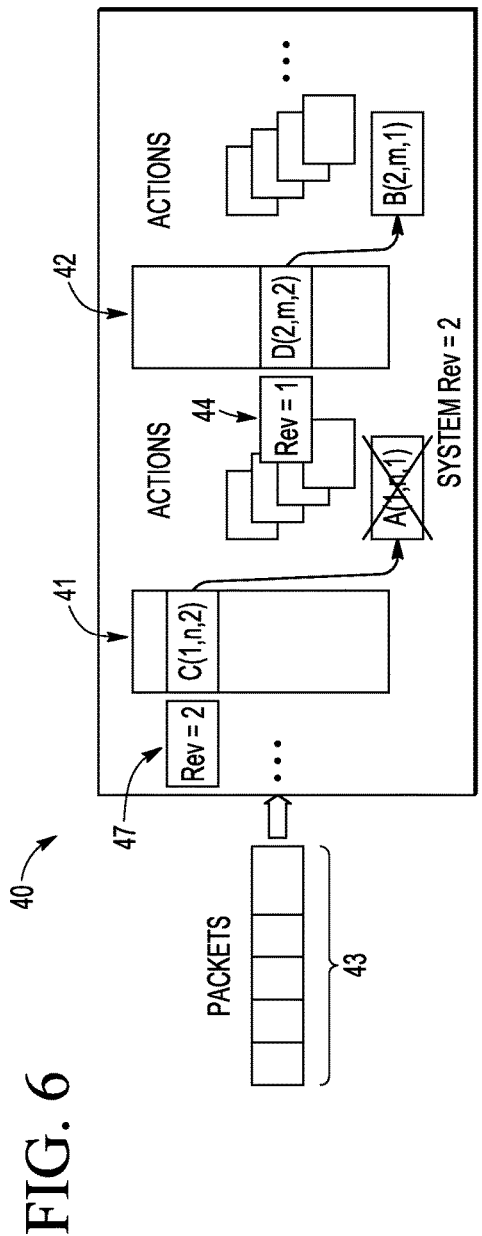

If no, the system searches at 85 for a shadowed table entry associated to the identified table entry of index n, whose table entry version number Ver matches the attribute of the packet. This is illustrated in FIG. 6 with respect to the example of packet 44 and table 42. The system then proceeds at 88 with execution on the packet of the actions defined by table content B (2, m, 1).

If yes, then at 86 the system erases all the shadowed entries associated to the identified table entry. This is illustrated in FIG. 6 with respect to packet 47 and table 41. Then, at 87 the table entry version number of the table entry is reinitialized, namely is reset to 1 in the example. The process then jumps to 88 where the system executes on the packet the actions defined by content C (1, n, 2).

The system may be any suitable system, and for example be a, fast, system where multiple packets flow through the system at any given time, and where these packets can each be in a respective processing state. In order to prevent the loss of packets due to the update operation, the solution offers an alternative to a draining scheme as known in the existing state of the art with minimal memory overhead. Indeed, only the updated entries need to be shadowed, instead of all the look-up table to which these entries belong.

Figure 5:
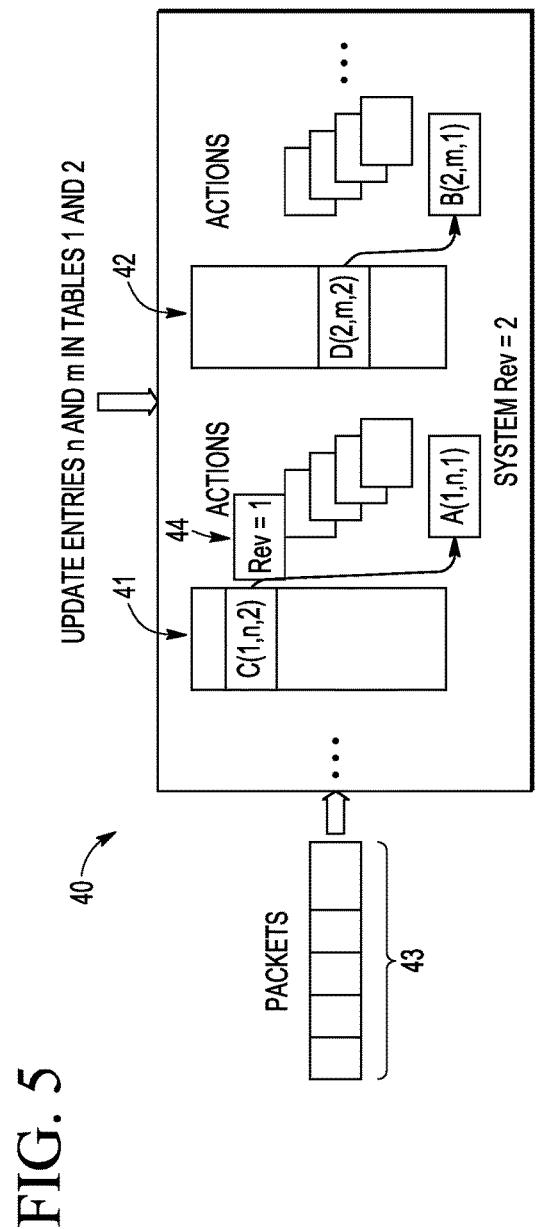

With reference to FIG. 5, there will now be described the creation of shadowed versions of updated table entries according to embodiments.

As shown in FIG. 5, content A of entry n in table 41 is updated to a new content C. Similarly content B of entry m in table 42 is updated to a new content D. Further, the table entry version number Ver of each updated entry is respectively set to the current system revision number Rev. Thus, in the shown example, parameter Ver is equal to 2 for the entry of table 41 with content C and for the entry of table 42 with content D.

In updating the system, the content of each updated entry changes. However, the previous content A (1, n, 1) and B (2, m, 1) of each updated entry of index n and m of table 41 and 42, respectively, is shadowed, namely copied into respective further memory units of the system memory shadowed table entries. Each shadowed table entry is associated to the corresponding updated entry by any suitable means, for example a memory pointer or the like. However, the table entry version number Ver of the shadowed entry is equal to the previous value of the table entry version number of the associated updated entry, that is to say the value the latter had before being set to the current system revision number Rev as a result of the update operation. Therefore, the packet 44 whose the attribute is Rev=1 may still be processed by the shadowed entry and is not in a undetermined state.

In the same time, the system revision number Rev is incremented. As shown in FIG. 5, the system revision number Rev is now equal to 2. Therefore in the shown example, the system revision number is now equal to 2, so the next received packet will be assigned an attribute equal to Rev=2.

As shown on the example of the FIG. 6, when a next packet 47 is received by the system 40 after the update operation, this packet is assigned the attribute Rev=2.

When a table entry is identified by a table look-up operation performed for a packet having an attribute which is equal to or higher than the current table entry version number of the identified table entry, then any shadowed table entry associated with the identified table entry can be erased. Indeed, this means that all packets having the older system revision number have already been processed so that keeping the old version of the table entry is not necessary anymore. Therefore, in the general case, the shadowed entry which is erased is the one whose the table entry version number Ver is smaller or equal to the attribute of the received packet.

For example, as shown in FIG. 6, since the packet 47 which is submitted to a table look-up using the updated look-up table 41 has the current system revision number "Rev=2", the shadowed entry storing former content A (1, n, 1) of the identified table is not to be used and can be erased.

Figure 7:
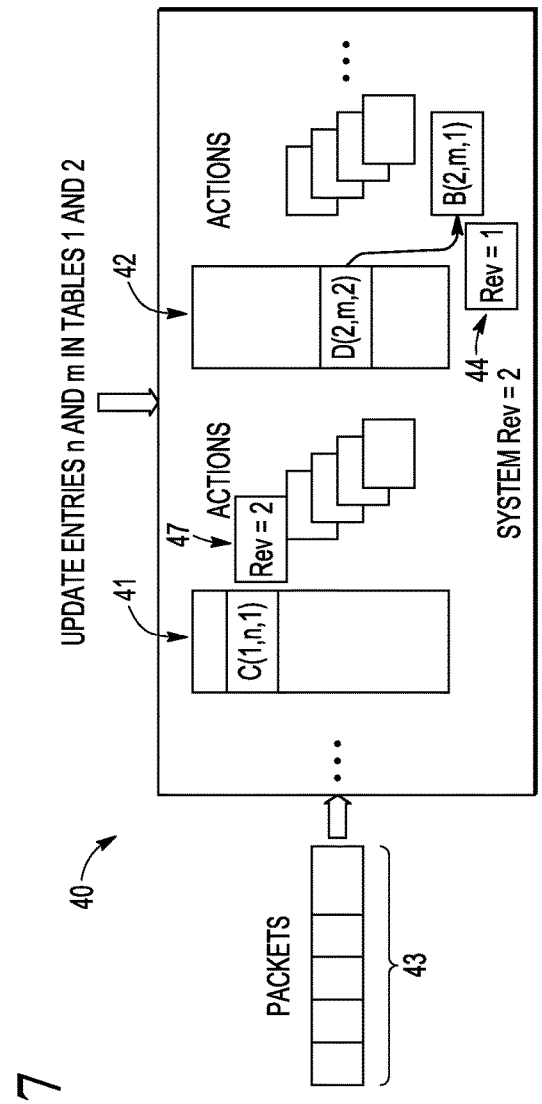

Then, as shown in FIG. 7, actions defined by content C (1, n, 1) in table 41 are performed on the packet 47. In addition, once all the actions defined by content A (1, n, 1) have been performed on the packet 44, the system 40 performs a TLU operation in the look-up table 42 to identify a table entry in said table 42 based on information in the header field of packet 44. Let us assume that the table entry which is thus identified is again the table entry of index m, having content D (2, m, 2). Given that the system revision number Rev for this packet is less than the table entry version number Ver of the entry (Rev=1 and Ver=2, and thus Rev<Ver), packet 44 is submitted to actions defined by the content B (2, m, 1) of the shadowed entry associated to the identified table entry of index m in table 42.

Figure 8:
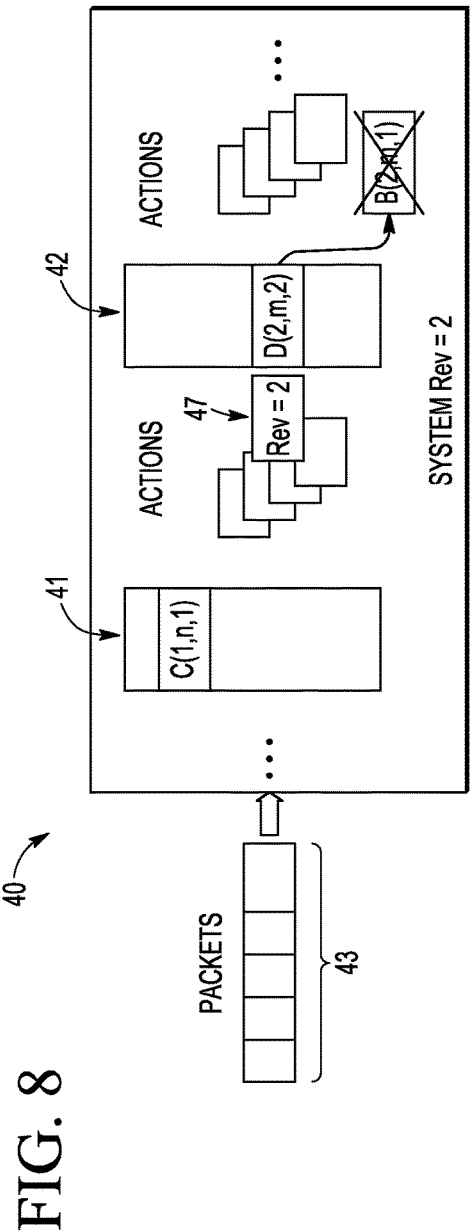
Figure 9:
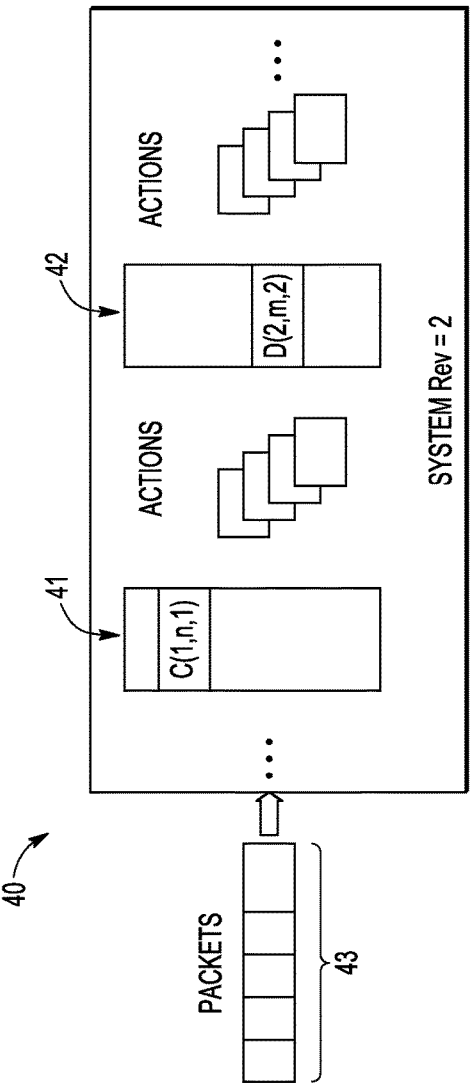

With reference to FIG. 8, when the next packet 47 having the attribute Rev=2 is submitted to a TLU operation with respect to table 42, a table entry is identified whose current table entry version number is equal to the attribute of packet 47. Then, any shadowed table entry associated with the identified table entry, namely the shadowed entry with content B (2, m, 1), can be erased.

The method process packets corresponding to the same table entry in their receipt order in the table. This prevents the system from inverting packets assigned with different system revision numbers. Indeed, such inversion of packets could lead to the deletion of one shadowed table entry whereas the system still comprises packets with an assigned system revision number matching an older table entry version number corresponding, so that content of the corresponding shadowed table entry is still to be used for processing the packet. Processing packets in their order of receipt within the system 40 prevents a packet from being kept in an undetermined state.

The method of updating may further comprise assigning the table entry version number of the identified table entry to the value initially set for the identified table entry, that is to say Ver=1 in the present example, once the attribute of the received packet is equal to or higher than the current table entry version number of the identified table entry. This allows limiting the size of the table entry version numbers which are maintained by the system, and thus keep the memory resources which are necessary thereto, to an acceptable amount. Thus, a table entry which the system revision number is equal to 1 is representative of the fact that there are no prior versions of this table entry, e.g., either the table entry was never modified or it has been modified but prior versions have already been deleted as they were no longer needed.

This is illustrated by the FIG. 7, wherein table entry content C (1, n, 2) is changed to C (1, n, 1), once the shadowed entry A (1, n, 1) has been deleted. Similarly, this is illustrated by the FIG. 9, wherein table entry content D (2, m, 2) is changed to D (2, m, 1), once the shadowed entry B (2, m, 1) has been deleted.

It will be appreciated that the method of look-up table updating has been described above with reference to examples of implementation only, but that variants are possible. For instance, according to the example of FIGS. 4-9 only one entry is updated in any table at a time, but the method can comprise update operations performed on several entries in one and the same table simultaneously.

It is also possible to update several times the same table entry by successive update operations. In such a case, this table entry may have several associated shadowed table entries which respectively correspond to several update operations. Each of these shadowed table entries may thus be assigned a specific table entry version number Ver, which corresponds to the standing system revision number Rev at the time of the corresponding update operation. In other words, the system may comprise a multi-level structure of linked shadowed entries corresponding to respective, e.g., successive, update operations carried out for one and the same table entry. As a matter of example, let us consider an update operation occurring on a system for which the current system revision number is rev=1. The system revision number thus becomes rev=2. Then, if a further update operation occurs, the system revision number becomes rev=3. Let us further consider that, in this specific example, these two successive update operations relate to the same table entry. Therefore, packets which are in an intermediate state can potentially have an attribute equal to rev=1 or rev=2. Hence a packet with the attribute rev=1 uses the content stored in the first level shadowed table entry which has the table entry version number Ver equal to 1 whereas a packet (input later in the system) with the attribute rev=2 uses the content of the second level shadowed table entry which has the table entry version number Ver equal to 2. It will be appreciated that each specific shadowed table entry can be erased independently from the others, but that, depending on the specific situation, more than one of the linked shadowed entries can be erased simultaneously as a consequence of the rules which have been described in the foregoing.

Also the examples given above relate to the management of a few packets only, but it will be appreciated that the described operations can be repeated for many packets flowing through the system at any given time.

Figure 10:
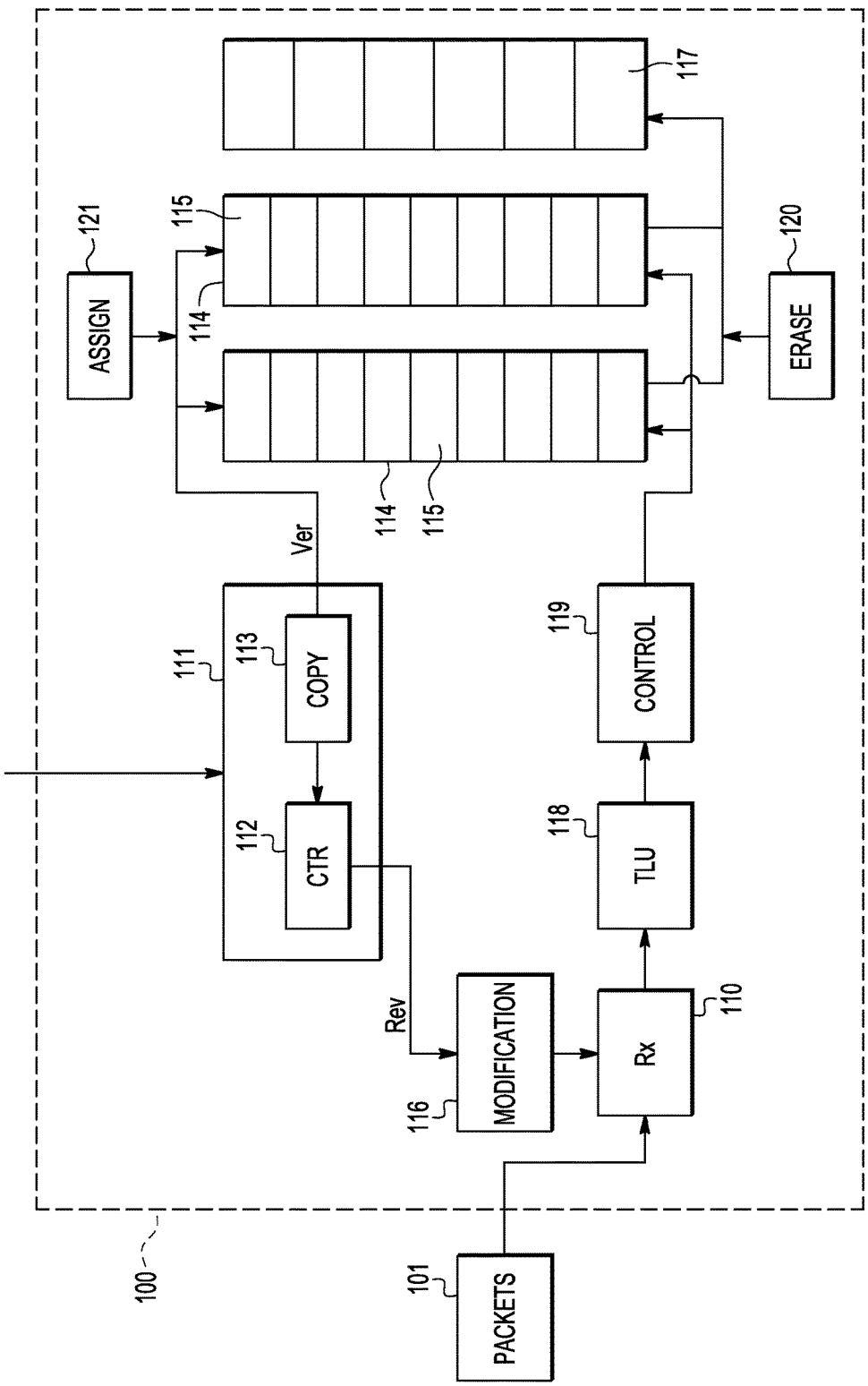
FIG. 10 schematically shows an example of a device performing the method as shown in FIG. 3.

With reference to FIG. 10, there is further proposed a device 100 for managing a flow of data packets in a multiple-processing entity system, adapted to implement the method as described in the foregoing.

The device as shown comprises a receiving unit 110 arranged to receive, one by one, packets of a flow of packet 101 to be processed in the system.

The device 100 further comprises an update unit 111 arranged to perform update operations on the content of at least one table entry 115 of at least one look-up table 114 responsive to a request for updating coming from the updated command external of the system.

The update unit 111 may comprise a counter 112 to increment, at each update operation, a system revision number Rev associated to the system which identifies the current version of the system. The update unit 111 may also comprise a replication unit 113 to copy, at each update operation, the current system revision number Rev in order to set a table entry version number Ver associated to the table entry being updated to the current version of the system the entry. The table entry version number Ver identifies the number of ongoing update operations for said entry.

The device 100 further comprises a packet modification unit 116 arranged to assign an attribute to the received packet, said attribute corresponding to the system revision number Rev.

The device 100 comprises a plurality of look-up tables, each table being divided into a plurality of table entries. Each entry is adapted to store information associated to actions to be performed on packets received by the system.

According to embodiment, the device further comprises shadowed table entries associated to any table entry being updated, storing the previous content of said table entry being updated in association with the table entry version number y, for use for managing packets received in the system prior to any update operation. In the shown example, the device 100 comprises two look-up tables 114 each one divided into nine entries 115, and six shadowed table entries 117.

Moreover, the device 100 comprises an identification unit 118 arranged to perform, for each packet and for each look-up table 114, a TLU operation to identify a table entry of the look-up table based on information in a header field of the packet.

In addition, a control unit 119 is arranged to submit the packet to actions defined by the content of the identified table entry if the packet attribute is equal to or higher than the table entry version number y of the identified table entry, or else, to submit the packet to actions defined by the content of the shadowed entry associated to the identified table entry, the table entry version number y of which is equal to the packet attribute. After performing a TLU operation, and if the table entry version number y of the identified table entry is equal to the table entry version number initially set for the identified table entry, the control unit is further arranged to submit the packet to actions defined by the content of the identified table entry irrespective of the packet attribute.

The device 100 further comprises an erasing unit 120 adapted to erase any shadowed entry after actions associated to the content of said shadowed entry have been performed with respect to all packets whose packet attribute is less than the table entry version number of the table entry associated to said shadowed entry.

The device 100 further comprises a assigning unit 121 adapted to assign the table entry version number of the identified table entry to the value initially set for the identified table entry, that is to say Ver=1 in the present example, once the attribute of the received packet is equal to or higher than the current table entry version number of the identified table entry.

Thus, as explained above, it is possible to continue using look-up tables while updating process is being carried out for some or all of the table entries. The solution provides benefits for systems that are limited in space and cost, by use of minimal memory thanks to the storing of small shadowed data instead of full shadowed table.

Protocols such as IP forwarding and security channels may be implemented using this method.

The solution may also be implemented in a computer program for running on a computer system, at least including code portions for performing a method according to the invention when run on a programmable apparatus, such as a computer system or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a tangible and non-transitory data carrier, such as a CD-rom or diskette, stored with data loadable in a memory of a computer system, the data representing the computer program. The data carrier may further be a data connection, such as a telephone cable or a wireless connection.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIGS. 4-9 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system are circuitry located on a single integrated circuit or within a same device. Alternatively, system may include any number of separate integrated circuits or separate devices interconnected with each other. For example, memory may be located on a same integrated circuit as masters or on a separate integrated circuit or located within another peripheral or slave discretely separate from other elements of system. Peripheral and I/O circuitry may also be located on separate integrated circuits or devices. Also for example, system or portions thereof may be soft or code representations of physical circuitry or of logical representations convertible into physical circuitry. As such, system 10 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

In the foregoing specification, the invention has been described with reference to specific examples of embodiments of the invention. It will, however, be evident that various modifications and changes may be made therein without departing from the broader scope of the invention as set forth in the appended claims, and that the claims are not intended to be limited to the examples shown. For example, the connections may be a type of connection suitable to transfer signals from or to the respective nodes, units or devices, for example via intermediate devices. Accordingly, unless implied or stated otherwise the connections may for example be direct connections or indirect connections.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device.

Also, devices functionally forming separate devices may be integrated in a single physical device.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A method of managing a flow of data packets in a multiple-processing entity system comprising a plurality of look-up tables adapted to store information associated to actions to be performed on packets received by the system,
   responsive to a request for updating at least one table entry of at least one look-up table:
   incrementing a system revision number associated to the system which identifies the current version of the system, and setting to the current version of the system a table entry version number associated to the table entry being updated which identifies the number of ongoing update operations for said entry;
   storing, on a per entry basis, in a shadowed entry associated to any table entry being updated, the previous content of said table entry being updated, in association with the table entry version number, for use for managing packets received in the system prior to any update operation; and,
   upon receipt of a new packet into the system:
   assigning an attribute to the received packet, said attribute corresponding to the system revision number,
   for each look-up table, processing packets in order of receipt in the table, said processing comprising, for each packet:
   performing a table look-up operation in the look-up table, to identify a table entry in said look-up table based on information in a header field of the packet;
   if the packet attribute is equal to or higher than the table entry version number of the identified table entry, then submitting the packet to actions defined by the content of the identified table entry, or else,
   submitting the packet to actions defined by the content of the shadowed entry associated to the identified table entry, the table entry version number of which is equal to the packet attribute.

2. The method of claim 1 wherein, after performing a table look-up operation, and if the table entry version number of the identified table entry is equal to the table entry version number initially set for the identified table entry, then submitting the packet to actions defined by the content of the identified table entry irrespective of the packet attribute.

3. The method of claim 1, further comprising erasing any shadowed entry after actions associated to the content of said shadowed entry have been performed with respect to all packets having packet attributes that are is less than the table entry version number of the table entry associated to said shadowed entry.

4. The method of claim 3, further comprises assigning the table entry version number of a table entry to the value initially set for said table entry once the packet attribute of the received packet is equal to or higher than the table entry version number of said table entry.

5. A computer program product comprising a plurality of instructions stored in a non-transitory media accessible to a processor for executing instructions, computer program product for managing a flow of data packets in a multiple-processing core system comprising:
   instructions for receiving packets to be processed in the system;
   instructions for performing update operations on the content of at least one table entry of at least one look-up table responsive to a request for updating, to increment a system revision number associated to the system which identifies the current version of the system and to set to the current version of the system a table entry version number associated to the table entry being updated which identifies the number of ongoing update operations for said entry;
   instructions for assigning an attribute to the received packet, said attribute corresponding to the system revision number;
   instructions for storing a plurality of look-up tables, each table being divided into a plurality of table entries, each entry storing information associated to actions to be performed on packets received by the system;
   instructions for storing the previous content of said table entry being updated in association with the table entry version number in shadowed table entries associated with any table being updated, for use for managing packets received in the system prior to any update operation;
   instructions for performing for each packet and for each look-up table, a table look-up operation to identify a table entry of the look-up table based on information in a header field of the packet; and,
   instructions for submitting
   the packet to actions defined by the content of the identified table entry if the packet attribute is equal to or higher than the table entry version number of the identified table entry, or else,
   the packet to actions defined by the content of the shadowed entry associated to the identified table entry, the table entry version number of which is equal to the packet attribute.

6. The computer program product of claim 5, wherein, if the table entry version number of the identified table entry is equal to the table entry version number initially set for the identified table entry, the computer program product further comprising instructions for submitting the packet to actions defined by the content of the identified table entry irrespective of the packet attribute.

7. The computer program product of claim 5, further comprising instructions for erasing any shadowed entry after actions associated with the content of said shadowed entry have been performed with respect to all packets whose packet attribute is less than the table entry version number of the table entry associated with said shadowed entry.

8. The computer program product of claim 7, further comprising instructions for assigning the table entry version number of a table entry to the value initially set for said table entry once the packet attribute of the received packet is equal to or higher than the table entry version number of said table entry.

9. A computer program product comprising one or more stored sequences of instructions in a non-transitory media that are accessible to a processor and which, when executed by the processor, cause the processor to perform the method of claim 1.

10. The method of claim 2, further comprising erasing any shadowed entry after actions associated to the content of said shadowed entry have been performed with respect to all packets whose packet attribute is less than the table entry version number of the table entry associated to said shadowed entry.

11. The method of claim 10, further comprises assigning the table entry version number of a table entry to the value initially set for said table entry once the packet attribute of the received packet is equal to or higher than the table entry version number of said table entry.

12. The computer program product of claim 6, further comprising instructions for erasing any shadowed entry after actions associated to the content of said shadowed entry have been performed with respect to all packets whose packet attribute is less than the table entry version number of the table entry associated to said shadowed entry.

13. The computer program product of claim 12, further comprising instructions for assigning the table entry version number of a table entry to the value initially set for said table entry once the packet attribute of the received packet is equal to or higher than the table entry version number of said table entry.

14. A computer program product comprising one or more stored sequences of instructions that are accessible to a processor and which, when executed by the processor, cause the processor to perform/to carry out the method of claim 2.

15. A computer program product comprising one or more stored sequences of instructions that are accessible to a processor and which, when executed by the processor, cause the processor to perform/to carry out the method of claim 3.

16. A computer program product comprising one or more stored sequences of instructions that are accessible to a processor and which, when executed by the processor, cause the processor to perform/to carry out the method of claim 4.

* * * * *